United States Patent
Prueitt et al.

(10) Patent No.: US 7,747,699 B2
(45) Date of Patent: Jun. 29, 2010

(54) METHOD AND SYSTEM FOR GENERATING A PERMANENT RECORD OF A SERVICE PROVIDED TO A MOBILE DEVICE

(76) Inventors: James K. Prueitt, 51 Turner St., Dedham, MA (US) 02026; Richard A. Pineau, 395 Chestnut St., No. Andover, MA (US) 01845; Kevin F. Bernier, 53 Gardner Rd., Brookline, MA (US) 02445; Todd M. Lynton, 1008 Massachusetts Ave., Apt. 411, Cambridge, MA (US) 02138; Scott D. Wicker, 11 Rennie Dr., Andover, MA (US) 01810

( * ) Notice: Subject to any disclaimer, the term of this patent is extended or adjusted under 35 U.S.C. 154(b) by 897 days.

(21) Appl. No.: 09/870,538

(22) Filed: May 30, 2001

(65) Prior Publication Data

US 2002/0184302 A1 Dec. 5, 2002

(51) Int. Cl.
G06F 15/16 (2006.01)
G06F 15/00 (2006.01)
G06F 3/12 (2006.01)
G06K 1/00 (2006.01)

(52) U.S. Cl. ..................... 709/219; 358/1.15
(58) Field of Classification Search ......... 709/217–219; 705/1, 64, 14, 7; 455/414.1–414.3, 555, 455/556.1; 358/1.15
See application file for complete search history.

(56) References Cited

U.S. PATENT DOCUMENTS

| | | | |
|---|---|---|---|
| 5,694,484 A | 12/1997 | Cottrell et al. | 382/167 |
| 5,757,976 A * | 5/1998 | Shu | 382/252 |
| 5,854,882 A * | 12/1998 | Wang | 358/1.9 |
| 5,855,007 A | 12/1998 | Jovieie et al. | 705/14 |
| 5,859,628 A * | 1/1999 | Ross et al. | 345/173 |
| 6,043,898 A | 3/2000 | Jacobs | 358/1.15 |
| 6,128,415 A | 10/2000 | Hultgren, III et al. | 382/276 |
| 6,215,561 B1 * | 4/2001 | Kakutani | 358/1.9 |
| 6,241,673 B1 * | 6/2001 | Williams | 600/437 |
| 6,553,240 B1 * | 4/2003 | Dervarics | 455/566 |
| 6,623,527 B1 | 9/2003 | Hamzy | |

(Continued)

FOREIGN PATENT DOCUMENTS

EP  0 738 956  10/1996

(Continued)

OTHER PUBLICATIONS

St. Pierre et al. "service printer template"—The Internet Society 'Online! 2000, pp. 1-13, XP002223084.

(Continued)

Primary Examiner—Benjamin R Bruckart
(74) Attorney, Agent, or Firm—Woodcock Washburn LLP

(57) ABSTRACT

System and methods are disclosed that provide users of mobile digital devices the opportunity to obtain a permanent record of the service rendered at the mobile device for all modes of web based services, location based services, services originating at the mobile device and not related to the location of the device, services originating via a voice portal, web based services originating via voice communication. Services include location independent services, such as tickets and coupons, and location based services, such as obtaining directions/or and maps to the nearest store or hotel or to a given location, obtaining traffic information, and receiving location-based coupons at the mobile device.

20 Claims, 15 Drawing Sheets

U.S. PATENT DOCUMENTS

| | | | |
|---|---|---|---|
| 6,725,051 B2 * | 4/2004 | Fidler | 455/456.1 |
| 6,785,022 B1 | 8/2004 | Todaka | |
| 6,785,542 B1 | 8/2004 | Blight et al. | |
| 6,804,534 B2 * | 10/2004 | Lai et al. | 455/556.1 |
| 6,856,412 B1 | 2/2005 | Kaneko | |
| 6,931,432 B1 | 8/2005 | Yoshida | |
| 7,006,242 B2 | 2/2006 | Smith, II et al. | |
| 7,068,846 B1 | 6/2006 | Yaguchi | |
| 7,092,119 B1 * | 8/2006 | Hinds et al. | 358/1.9 |
| 7,188,137 B2 * | 3/2007 | Inoue et al. | 709/203 |
| 7,272,788 B2 | 9/2007 | Anderson et al. | |
| 2001/0024518 A1 | 9/2001 | Yaguchi | |
| 2001/0042010 A1 | 11/2001 | Hassell | |
| 2002/0040332 A1 | 4/2002 | Maari et al. | |
| 2002/0065101 A1 | 5/2002 | Picoult et al. | |
| 2002/0065873 A1 * | 5/2002 | Ishizuka | 709/203 |
| 2002/0113994 A1 * | 8/2002 | Smith et al. | 358/1.15 |
| 2002/0174205 A1 * | 11/2002 | Nakashima | 709/221 |
| 2002/0188673 A1 | 12/2002 | Gimson | |
| 2003/0002072 A1 | 1/2003 | Berkema et al. | |
| 2003/0038963 A1 * | 2/2003 | Yamaguchi | 358/1.15 |
| 2003/0115250 A1 | 6/2003 | Bernier | |
| 2003/0208560 A1 * | 11/2003 | Inoue et al. | 709/219 |
| 2004/0010540 A1 | 1/2004 | Puri et al. | |
| 2005/0235202 A1 | 10/2005 | Chen et al. | |

FOREIGN PATENT DOCUMENTS

| | | |
|---|---|---|
| EP | 1 100 003 | 10/2000 |
| GB | 2 303 478 | 2/1997 |
| JP | 10191453 | 7/1998 |
| WO | WO 95/30199 | 11/1995 |
| WO | WO 96/13814 | 5/1996 |
| WO | WO 01/03040 | 1/2001 |
| WO | WO 01/13307 | 2/2001 |
| WO | WO 01/16853 | 3/2001 |
| WO | WO 01/73644 | 10/2001 |
| WO | WO 01/95267 | 12/2001 |
| WO | WO 02/01451 | 1/2002 |

OTHER PUBLICATIONS

U.S. Appl. No. 09/870,536, filed May 30, 2001.
U.S. Appl. No. 09/870,561, filed May 30, 2001.
U.S. Appl. No. 09/870,537, filed May 30, 2001.
"Barcoded E-Tickets And Coupons On I-Mode", May 7, 2001, pp. 1-3, MobileMediaJapan.com, http://www.mobilemediajapan.com/newsdesk/q-phon.
TicketMaster.com order page, pp. 1-3, www.ticketmaster.com.
Wireless Application Protocol (WAP), pp. 1-7, http://www.iit.edu/~diazrob/wap.html.
"Imode"-Eurotechnology's Short Guide to DoCoMo's Wireless Internet System, pp. 1-3, Oct. 14, 2000, www.eurotechnoloay.com.
"Wireless Web Special Report", F. Harvey, K. J. Bannan, pp. 40-49, Oct. 2000, Scientific American.

* cited by examiner

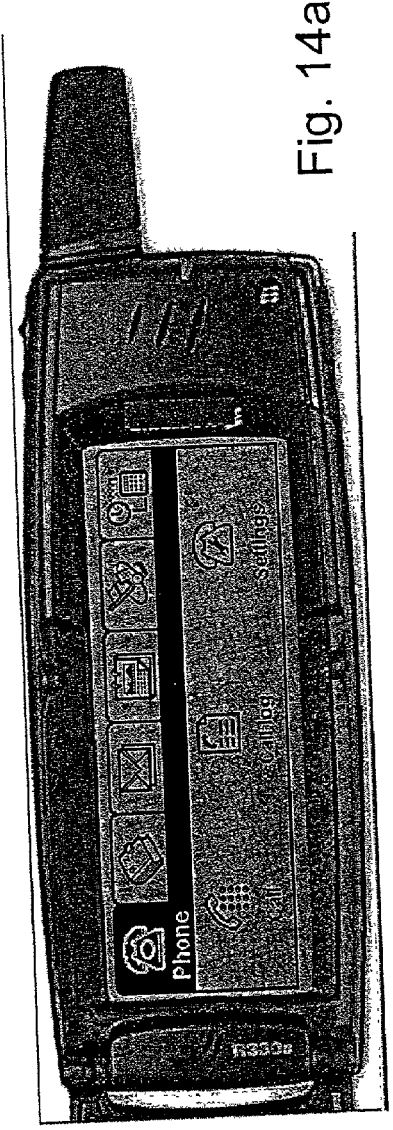
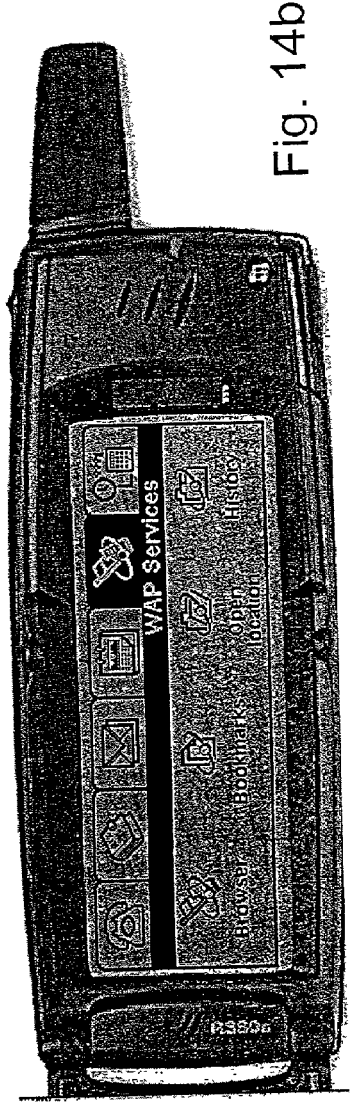

METHOD AND SYSTEM FOR GENERATING A PERMANENT RECORD OF A SERVICE PROVIDED TO A MOBILE DEVICE

BACKGROUND OF THE INVENTION

1. Field of the Invention

The present invention relates to services available via the use of mobile devices. More specifically, it relates to providing a permanent record, at the mobile device, of the service rendered.

2. Background Description

As the infrastructure for mobile access to the World Wide Web grows, the number of possible applications also proliferates. Acceptance of the mobile world wide Web also continues to grow, specifically in Japan and Europe. By September 2000, the NTT. DoCoMo I-mode service had over 15 million users. I-mode services, by September 2000, included banking, trade (credit card of, securities, insurance), travel services, ticket services (concerts, events, etc.), restaurant information, e-mail, news, games, and animated cartoons. The vision of personal services and e-commerce accessible via a mobile device is an exciting one.

The infrastructure in place as of 2000 uses either compact HTML (cHTML) or the wireless applications protocol (WAP) and its markup language WML. The NTT. DoCoMo I-mode service, with 21.7 million subscribers (which constitutes approximately 60% of the world wide wireless internet users), uses c-HTML and a packet switched internet protocol system besides a traditional circuit switched system (PDC—Personal Digital Cellular). (In circuit switched systems, after a connection is made, part of the network is dedicated to that connection. In packet switched networks, the information is divided into packets, sent through the network and reassembled at the receiving end; thus, the entire network is available to all connections.) In I-mode, the content (that is, the web sites of interest) is provided by service providers using HTTP, the standard web protocol, to a so called I-mode center. The I-mode center converts the HTTP protocol to the reduced protocol accepted by the phones thereby enabling the content to be delivered to the phone.

The other 39% of the wireless internet users use phones that utilize the wireless applications protocol (WAP). As of 2000, WAP enabled phones utilized the existing circuit switched network. The markup language for WAP is WML. Similar to HTML, WML is read and interpreted by a browser (a micro-browser) built into the WAP enabled device. In WAP enabled phones, when the user, via a micro-browser, requests a URL, the request for the URL is sent to a WAP gateway. The gateway connects to the Internet and serves an interface between the Internet service at a web server and the WAP-enabled phones. Some WAP gateways convert HTML documents into WML. In other cases, the web server containing the service (web pages) of interest provides the WML documents.

The applications envisioned for mobile devices range from obtaining event tickets and coupons to the so-called location based services. Location based services, tied to means of obtaining location information such as GPS, include getting directions to the nearest store or hotel, locating one's current position, obtaining traffic information, and receiving location-based advertising at the mobile device.

Some of these applications are already being offered. In Japan, the ALAN Corporation offers a service name Q-PHON in which a coupon with a bar-code is displayed on an I-mode phone and the consumer can use the coupon by presenting the phone. The bar-code serves as a means of validating the coupon. While this service is exciting, it also presents some of the shortcomings of the presently available services. As has been described, with over 100,000 registered subscribers, access to the service can be slow at times and patience is recommended. ("Barcoded L-Tickets and Coupons on i-mode", Mobile Media Japan, http[COLON][SLASH][SLASH]www[DOT]mobilemediajapan[DOT]com[SLASH]newsdesk[SLASH]q-phon, May 7, 2001). This recommendation presents no consolation to a consumer attempting to enter the theater before the beginning of the first act. A hardcopy ticket which the consumer could obtain before the event would be desirable.

A different approach to the providing of tickets via the Internet is used by TicketMaster online ticketing service. Using that service, the consumer can order a ticket for an event and have the ticket mailed or retrieve the ticket at the "will-call" window. The convenience of purchasing a ticket just before the event or of not having to wait in a queue if the ticket is purchased several days before the event is not provided.

Location based services can presently provide maps, advertisement at the mobile device. The map, in the case of a location based service, is confined to the display in the mobile device, has to be viewed at the resolution of the display in the mobile device and an interruption of service will cause such a map to vanish. A hardcopy version of the map would not have those shortcomings.

However, some of the characteristics of mobile handheld devices such as smart phones, smart communicators, and mobile PDAs, present hardware challenges to providing hardcopy output for wireless world wide Web applications. The mobile devices have small memory, low-power CPUs and reduced operating systems. The use of printer drivers is not typical in these devices (most likely, due to the lack of memory space and due to the reduced operating system). In today's Web enabled mobile devices printing is achieved by using the printer as a data device. The printer is connected to the dataport of the mobile device and data is sent to the printer. The printer must have some of the capabilities of a modem, for example, an IP stack. In this method of operations, the image being printed will not be displayed in the display of the mobile device. Also in this method of operation, the mobile device has to switch from being a Web access device to being a data or voice device. Having to switch from being a Web access device to being a data or voice device presents a significant hurdle to the providing of hardcopy for web enabled services. The consumer is not provided with the opportunity to obtain a permanent record of the service rendered, such as tickets, coupons, and maps, at the mobile device.

SUMMARY OF THE INVENTION

It is the primary object of this invention to provide users of mobile digital devices the opportunity to obtain a permanent record of the service rendered at the mobile device.

The opportunity to obtain a permanent record of the service rendered at the mobile device should be available regardless for all modes of web based services-location based services, services originating at the mobile device and not related to the location of the device, services originating via a voice portal, web based services originating via voice communication. (A voice portal, sometimes referred to as a vortal, is a Web site or other service that a user can reach by telephone.)

To achieve the object of this invention for services originating at the mobile device and not related to the location of the device, one aspect of the invention includes a method for providing a service at a mobile device and generating, at the location of the mobile device, a permanent record of the service, the service and the permanent record being processed by at least one of many remote servers. The method comprises the steps of (a) receiving at a receiving center, from the mobile device, a request for the service, (b) providing, from the receiving center, data for the request to a service server, the service server being one of the at least one of many remote servers, (c) processing the request for service at the service server, the processing generating the data for the service, (d) providing the data for the service to a printing server, the printing server being one of the at least one of many remote servers, (e) processing, at the printing server, the data and other stored data to generate input data for a specific printer, (f) transmitting to the mobile device the input data, the input being rendered by the specific printer at the location of the mobile device as the permanent record of the service.

In another aspect of this invention, the method also includes the step of completing a transaction at a transaction server, the transaction depending on the requested service, the transaction server being one of the at least one of many remote servers.

In still another aspect of this invention, the method also includes the step of sending, after step (c), to the mobile device, a message confirming that the request for service has been fulfilled.

To achieve the object of this invention for location based services, the method also includes the step of receiving at the receiving server, prior to step (c), data on the location of the mobile device, the data being generated by means for determining the location of a device.

The receiving center utilized in the above methods can be a receiving server. The receiving server can be the service server or the printing server or a separate server.

The receiving center utilized in the above methods can also be a voice portal.

Further aspects of this invention are systems to implement the methods, computer readable code that causes the systems to execute the methods and databases used in generating input data for a specific printer.

The request for the service can be generated via a voice portal, a telephone call to a receiving center, or via a Web enabled telephone network. The service can be the purchase of a ticket (where the ticket can be an event ticket or a airline, train or bus ticket), the obtaining of a coupon, the obtaining of maps for a specific region, or the obtaining of specific information such as restaurant reviews, menus, short reports. The services can be location based or not location specific.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 4 depicts a graphical representation of an embodiment of the system that enables the providing of a service at a mobile device and generating, at the location of the mobile device, a permanent record of the service, where the receiving center is a receiving server, and data on the location of the mobile device is available at the receiving server;

FIGS. 14A and 14B depict representations of graphical user interfaces for WAP enabled device.

DETAILED DESCRIPTION

To provide users of mobile handheld digital devices with the opportunity to obtain a permanent record of the service rendered at the mobile device, a system and method for providing a service at a mobile device and generating, at the location of the mobile device, a permanent record of the service are disclosed. A description of an embodiment of the system and the method of this invention is given first. A detailed description of several embodiments of the system and method of this invention are then described.

System and Method

Figure 1:
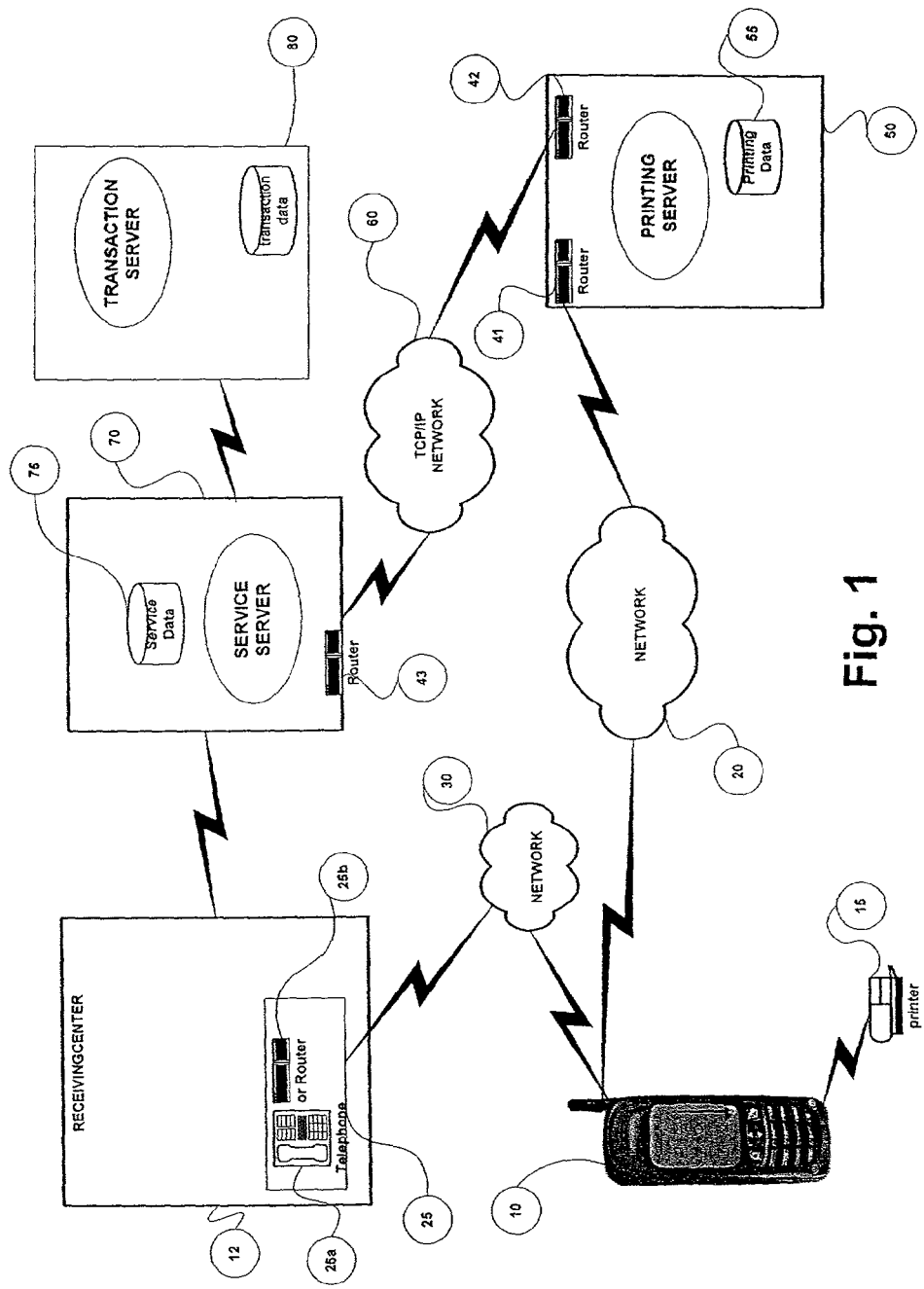
FIG. 1 depicts a graphical representation of an embodiment of a system that enables the providing of a service at a mobile device and generating, at the location of the mobile device, a permanent record of the service.
Figure 7:
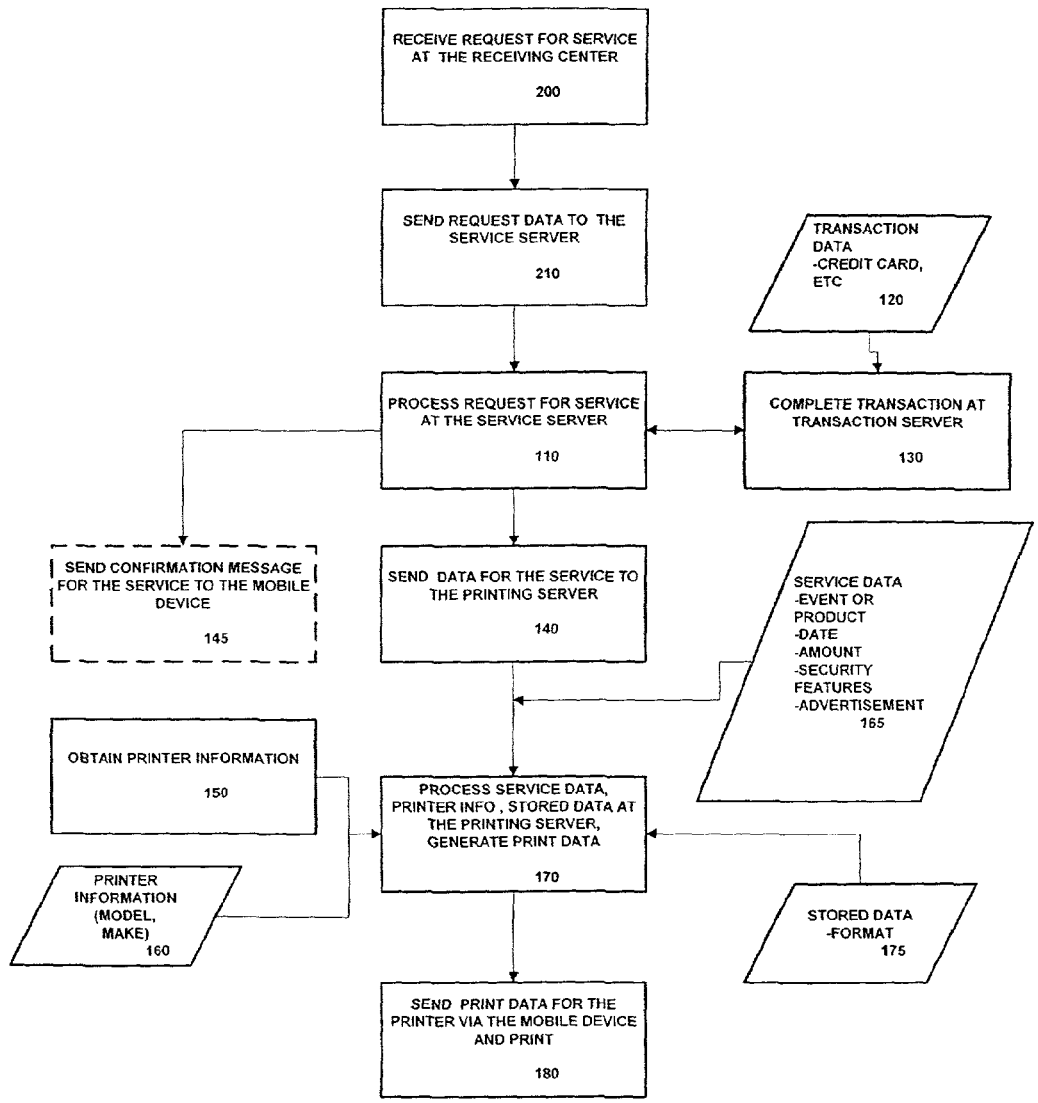
FIG. 7 depicts a flowchart of an embodiment of the method that enables the providing of a service at a mobile device and generating, at the location of the mobile device, a permanent record of the service.

FIG. 1 depicts an embodiment of a system that enables a user of a mobile digital device to receive a service at a mobile device 10 and generate, at the location of the mobile device 10, a permanent record of the service. FIG. 7 depicts a flowchart of an embodiment of the method. A mobile device 10 is utilized to send a request for a service through network 30 to a receiving center 12. Network 30 can be a voice network or a web enabled network. The request is received by a receiving unit 25 (step 200) which can be a telephone 25a or a router 25b depending on whether the network is a voice network or a web enabled network. From the receiving center 12, data for the request is provided to a service server 70 (step 210). The transmission of data from the receiving center 12 to the service server 70 can occur in different modes depending on the physical details of connection between the receiving center 12 and the service server 70. If the service server 70 is collocated with the receiving center 12, and the request was sent to the receiving center 12 via a voice portal or via voice, the receiving center 12 and the service server 70 could be connected by a local network. (If the request was sent via voice, an operator is likely to be involved in inputting the request into a computer system.) If the service server 70 is located at a remote location, the receiving center 12 and the service server 70 can be connected by a TCP/IP network. Once data for the request is received at the service server 70, the request for service is processed at the service server 70 (step 110). The processing of the request data generates the data for the service. The processing of the request data can comprise completing a transaction at a transaction server 80 (step 130). The details of the transaction will depend on the requested service. Transactions include credit card billing, account debit authorization. The exchange of data between the service server 70 and the transaction server 80 occurs through a network using a secure protocol (HTTPS, which is Secure HTTP, or Secure Socket Layer, SSL, for example).

Once the transaction is successfully completed, the processing of the request and the generation of the data for the service 165 are complete. At that point in the process, a message can be sent, from the service server 70, to the mobile device 10 confirming that the request for service has been completed (step 145). That message can contain information to ensure that, in the event that the permanent record is lost, the user can still obtain the service. Also at that point in the process, the data for the service 165 is provided to a printing server 50 (step 140). The service data 165 will be different for each type of service. For example, for tickets, the service data comprises an event name, an event date, seating information, a ticket price, security information, and an advertisement or logo. The printing server 50 interacts with the mobile device 10 via network 20. Network 20 can be a WAP network, an i-mode network, or any other web enabled mobile network. If the device 10 is a WAP enabled device, the network 20 includes a WAP gateway (not shown) that serves an interface between the Internet service at the printing server 50 and the WAP-enabled device 10. If the device 10 is an i-mode phone, network 20 is a packet switched network and includes an i-mode center server (also not shown) that converts between the HTTP protocol and the reduced protocol accepted by the device 10. Communication between the device 10 and the printing server 50 takes place via request and response sequences as in an HTTP network. Using the methods of in U.S. Publication No. 2002-0181010, "Method And Apparatus For Printing Remote Images Using A Mobile Device And Printer", filed on this same date, hereby incorporated by reference herein, the printing server 50 can obtain information 160 (FIG. 7) relating to the printer 15 which is connected (via a physical or wireless connection) to the dataport of the mobile device. The printer information 160 includes a name for the manufacturer and a model number for the specific printer, and/or any other printer descriptor for the specific printer. Using the printer information 160, the service data 165, and the data in a printing database 400 (FIG. 12) and a service database 500 (FIG. 13), further described hereinafter and which are contained in the printing data storage device 55 in the printing server 50, the print data is generated at the printing server 50 (step 170, FIG. 7). (The service database 500 includes the data format 175 for the permanent record for the service.) Using the method described in U.S. Pat. No. 5,694,484 (Cottrell et al., System and Method for Automatically Processing Image Data to Provide Images of Optimal Perceptual Quality, issued on Dec. 2, 1997), hereby incorporated by reference herein, in U.S. Pat. No. 6,128,415 (Hultgren et al., Device Profiles for Use in a Digital Image Processing System, issued on Oct. 3, 2000), which is also hereby incorporated by reference herein, and/or in U.S. Publication No. 2002-0181023, "Rendering Images Utilizing Adaptive Error Diffusion", filed on this same date, which is also hereby incorporated by reference herein, print data to produce an image of optimal perceptual quality rendered at the specific printer 15 of known characteristics can be generated at the printing server 50. Using the methods of U.S. Publication No. 2002-0181010, the print data is transmitted to the printer via the network 20 and the mobile device 10 (step 180, FIG. 7). The printer 15 prints the print data and generates a permanent record of the service.

Figure 2:
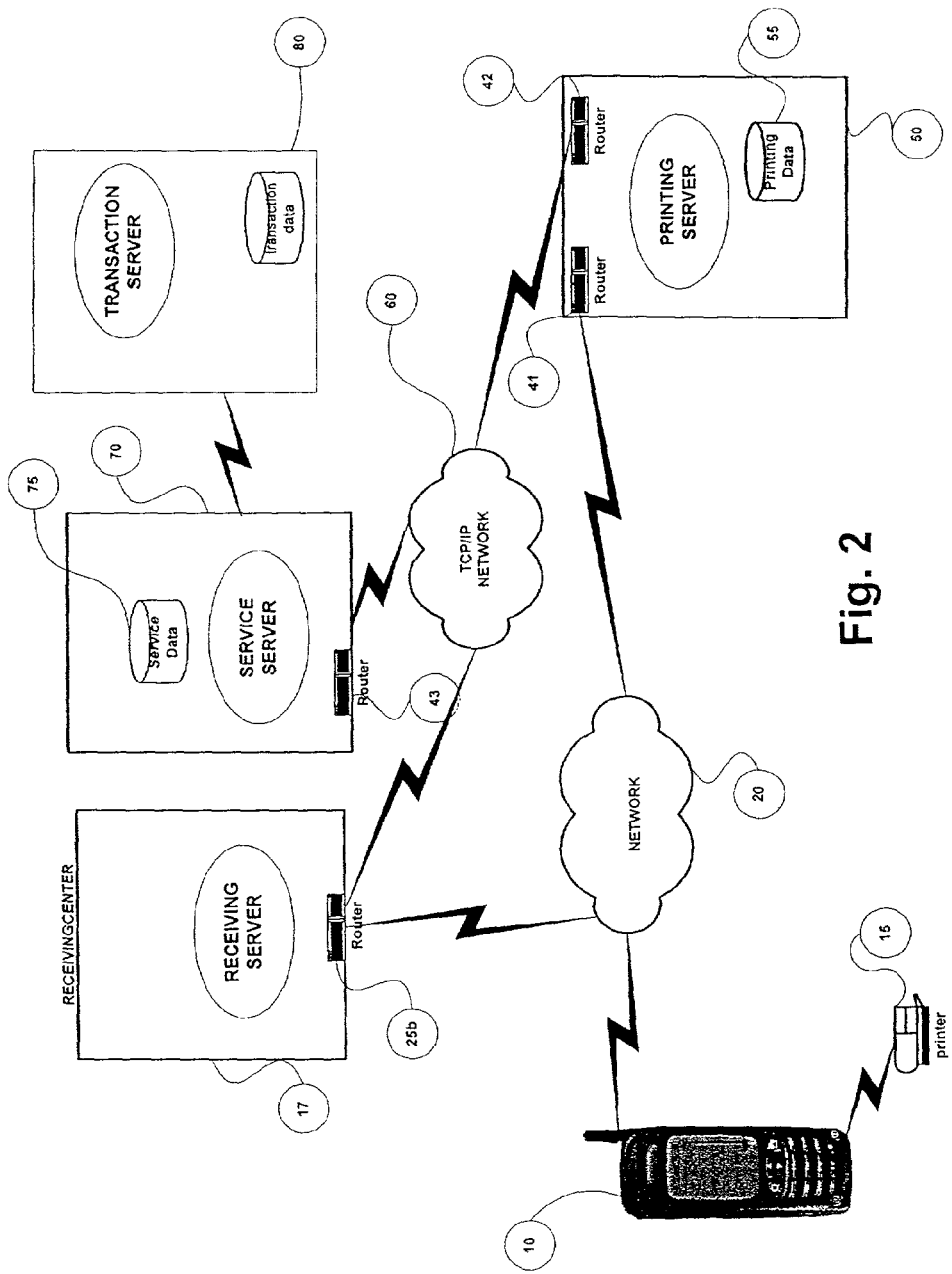
FIG. 2 depicts a graphical representation of an embodiment of the system that enables the providing of a service at a mobile device and generating, at the location of the mobile device, a permanent record of the service, where the receiving center is a receiving server.

The embodiment in which the receiving center 12 is a receiving server is shown in FIG. 2. Network 20 (FIG. 2), in one embodiment, is a web enabled wireless network such as a WAP network or an i-mode network. In the embodiment in which network 20 is a web enabled wireless network, transfer of data between the mobile device 10 and the receiving server 17 takes place by means of requests and responses similar to HTTP requests and responses.

In order to provide services originating at the mobile device 10 and related to the location of the device 10 (also referred to as location based services), the receiving server 17 has to receive, prior to processing the request for service, data on the location of the mobile device 10. In order to provide data on the location of the device 10, means for determining the location of the device 10 have to be provided. Location determining means can be network based (not requiring additional components in the device 10), device based (requiring additional components in the device 10), or can require that the user enter an indicator of the location. Exemplary forms of network based means are means using triangulation of the radio emission of the phone or using RF multipath "fingerprinting" to identify the most likely position of the radiating source. GPS (global positioning systems) methods are an exemplary form of device based methods. ZIP codes, addresses and phone area codes comprise exemplary forms of user supplied indicators of location.

Figure 4:
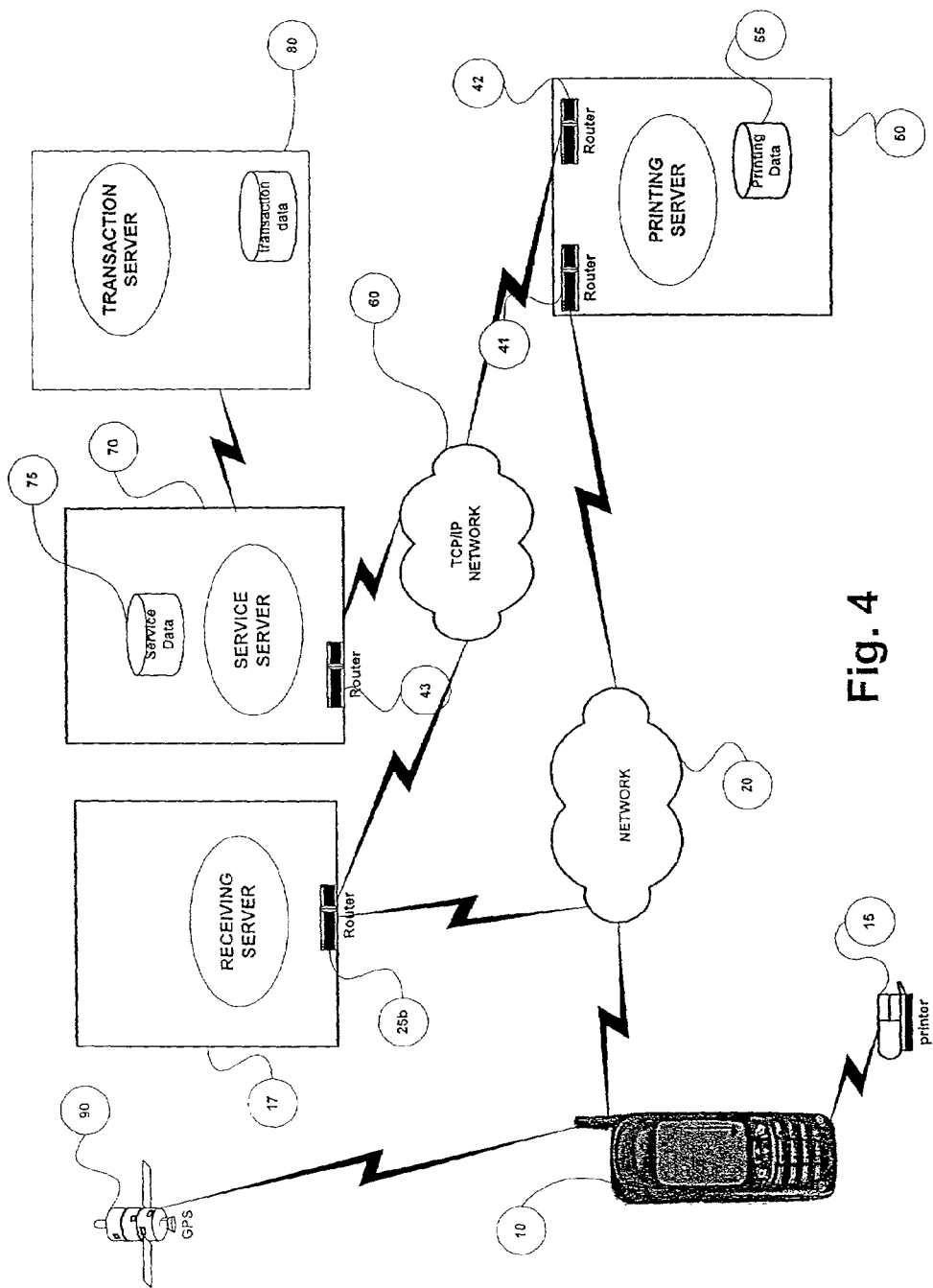
FIG. 4 depicts a graphical representation of an embodiment of the system that enables the providing of a service at a mobile device and generating, at the location of the mobile device, a permanent record of the service, where the receiving center is a receiving server, data on the location of the mobile device is available at the receiving server and the receiving server is the service server.
Figure 9:
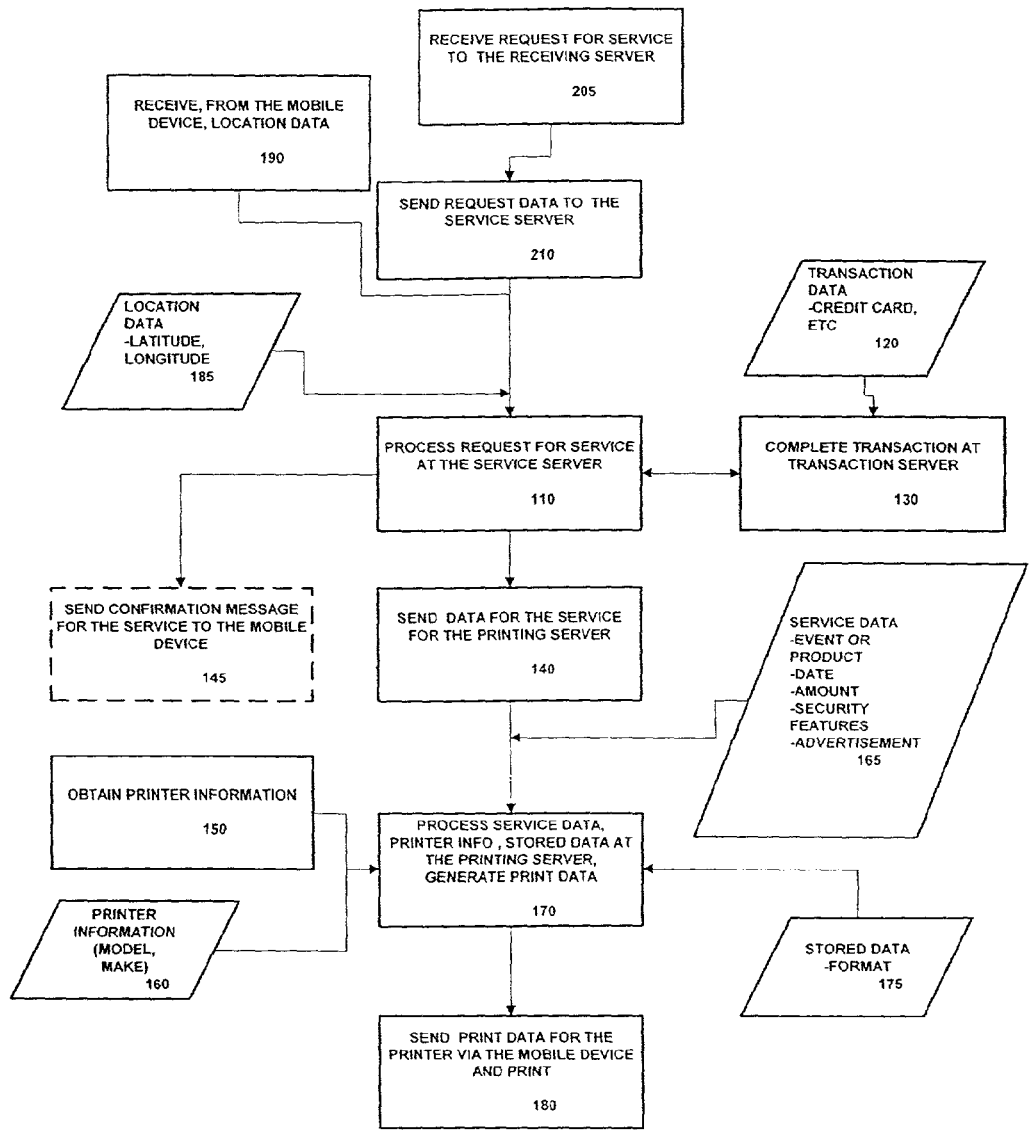
FIG. 9 depicts a flowchart of an embodiment of the method that enables the providing of a service at a mobile device and generating, at the location of the mobile device, a permanent record of the service, where the receiving center is a receiving server, and data on the location of the mobile device is available at the receiving server.

FIG. 4 depicts an embodiment of a system that enables a user of a mobile digital device to receive a location based service at a mobile device 10 and generate, at the location of the mobile device 10, a permanent record of the service. In the embodiment depicted in FIG. 4, a device based method, namely a GPS system 90, comprises the location determining means. FIG. 9 depicts a flowchart of an embodiment of the method by which a user of a mobile digital device receives a location based service at a mobile device 10 and generates, at the location of the mobile device 10, a permanent record of the service. Comparing FIGS. 4 and 9 to FIGS. 2 and 7, the system of FIG. 4 differs from that of FIG. 2 by the presence of the GPS system 90 and the method of FIG. 9 differs from that of FIG. 7 by the added step (step 190) of providing to the receiving server 17 the location data 185 (FIG. 9). The location data 185 comprises, in one embodiment, latitude and longitude of the mobile device. If, in one embodiment, network 20 (FIG. 4) is a web enabled wireless network such as a WAP network or an i-mode network and the location data 185 is provided by a device based method, namely a GPS system 90, the location data 185 can be provided to the receiving server 17 as data in the requests sent by the mobile device 10 to the receiving server 17. If, in another embodiment, the location data 185 is provided by network based methods, the location data 185 can be provided to the receiving server 17 as data inserted in the requests sent by the mobile device 10 (or additional requests) at the WAP gateway (not shown) or the I-mode center server before transmitting them to the receiving server 17. If, in still another embodiment, the location data 185 is provided by user input, the location data 185 can be provided to the receiving server 17 as data in the requests sent by the mobile device 10 to the receiving server 17.

Databases

The printing server 50 includes a data storage device 55 that contains the printing data and the printer and service databases 400, 500. It should be apparent that the data storage device 55 can be a component of the printing server 50 or can be a separate device physically connected to the printing server 50.

Figure 12:
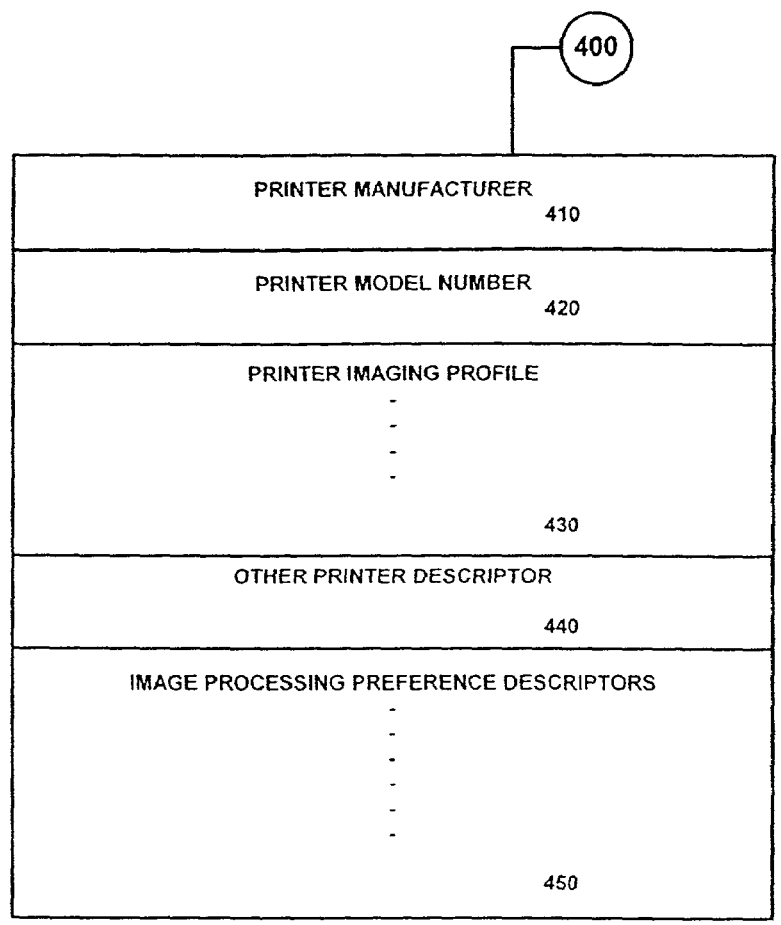
FIG. 12 illustrates the contents of an embodiment of the printer database.

Referring to FIG. 12, the printer database 400 comprises the name of the printer manufacturer 410, the printer model number 420, the printer imaging profile object 430, any other printer descriptor 440 and image processing descriptors 450. The methods described in U.S. Pat. No. 6,128,415 are used to define the printer imaging profile object 430. The printer imaging profile object 430 includes the printer resolution, the printed image size, printer spatial characteristics such as the Modulation Transfer Function and the Noise Power Spectrum, and printer color characteristics (if applicable). Image processing descriptors 450 provide preferences in rendering the image such as halftoning algorithms used and the parameters of such algorithms. Using the data in printer database 400 for a specific printer and the methods U.S. Pat. No. 5,694,484, an image of optimum perceptual quality can be obtained.

Figure 13:
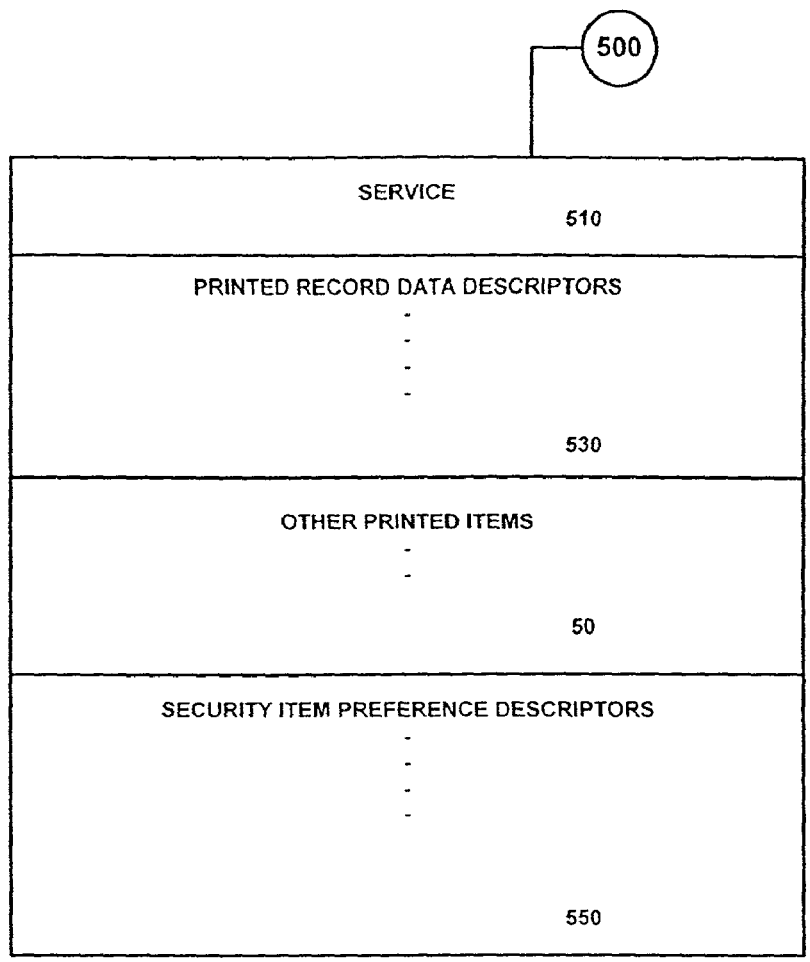
FIG. 13 illustrates the contents of an embodiment of the printed record database.

Referring to FIG. 13, the service database 500 comprises the name of the service 510, the printed record data object 530, other printed items 540, and security item preference descriptors 550. The printed record data object 530 comprises the format of the printed record, and other data needed to generate the printed record. The format includes the objects on the printed page (the printed record) and their location in the page. Other printed items 540 include advertisement Figs. included or graphics included. Security item preference descriptors 550 include the type of security item, such as bar code, digital watermark, a security image, and the data needed to generate the security item. Using the data in service database 500 for a specific service, the input data for generating a printed record is produced. This input data is processed according to the data in printer database 400 for a specific printer and the methods U.S. Pat. No. 5,694,484 to produce the print data sent to the printer 15 to create an image which is the printed record of the service.

Several detailed embodiments given below will further illustrate the invention.

Providing Tickets for an Event

Figure 3A:
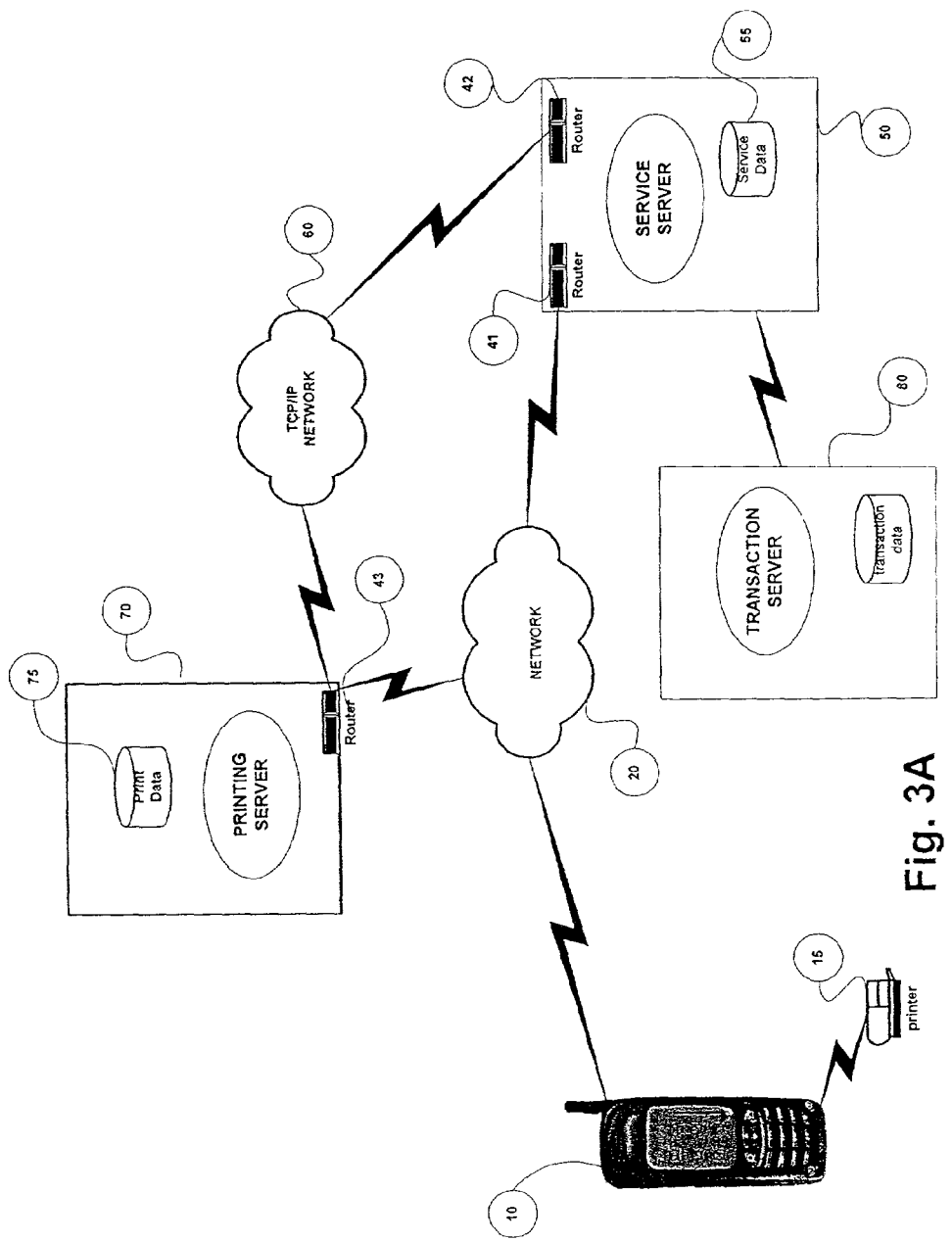
FIG. 3A depicts a graphical representation of an embodiment of the system that enables the providing of a service at a mobile device and generating, at the location of the mobile device, a permanent record of the service, where the receiving center is a receiving server and the receiving server is the service server.
Figure 8:
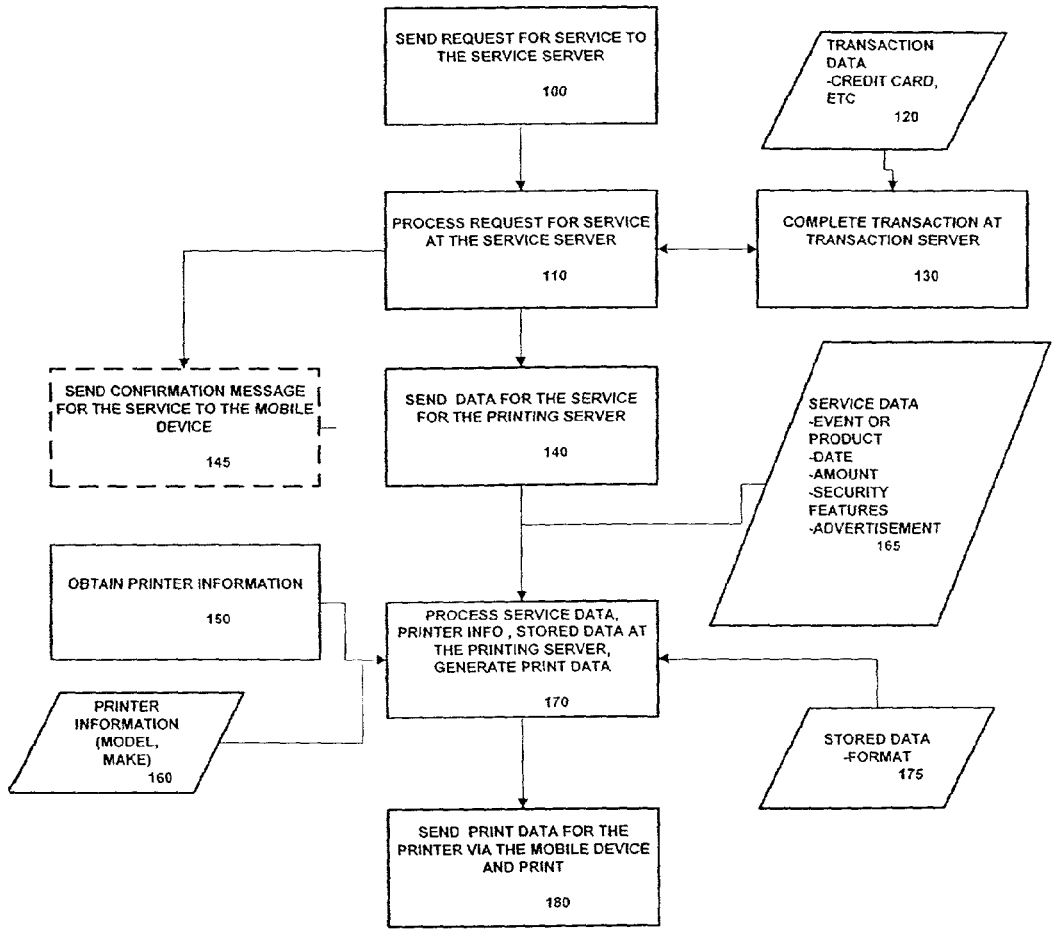
FIG. 8 depicts a flowchart of an embodiment of the method that enables the providing of a service at a mobile device and generating, at the location of the mobile device, a permanent record of the service, where the receiving center is a receiving server and the receiving server is the service server.

Referring to FIG. 3A, in one embodiment, the mobile device 10 is a WAP enabled device as shown in FIGS. 14A and 14B and the receiving server 17 is the service server 50. After selecting the WAP services mode as shown in FIG. 14B, the user can then select bookmarks or the micro browser. Referring to FIGS. 3A and 14B, when the user of the mobile device 10, the device 10 being in the Web access mode as shown in FIG. 14B, selects a bookmark, MyTickets web site for example, from the user's bookmarks, a WAP request is transmitted by the device 10 through the network 20 and is converted by the WAP Gateway (not shown) to a Web request which is transmitted to the service server 70. The MyTickets web site (not shown) resides at the service server 70. The service server 70 transmits back a response through the WAP Gateway and the network 20 to the micro browser in the device 10. Through a series of requests and responses, the user selects an event (step 100, FIG. 8). Through another series of requests and responses, at the service server 70, availability of tickets for the event is verified (which could involve accessing other servers which are not shown) and available seats are identified; the user selects a seating location and selects to purchase the tickets. The request to purchase the tickets results in a response informing the user that the user will view pages over a secure connection which will involve the transaction server 80. The user, then, through a series of requests and responses, provides billing information (transaction data) 120, either by entering by entering the data (credit card number and expiration date, billing address, etc.) or referring to data previously stored at the service server 70 or the transaction server 80, reviews the selection and completes the transaction (step 130, FIG. 8). This completes the processing of the order for the tickets (step 110, FIG. 8). At that point in the process, a message can be sent, from the service server 70, to the mobile device 10 confirming that the request for the ticket has been completed (step 145, FIG. 8). That message can contain information to ensure that, in the event that the permanent record is lost, the user can still obtain the service. The message could be electronic mail, an SMS service message, or any other form of electronic message. Also at this point in the method, the data for the service 165 is provided to the printing server 50 (step 140, FIG. 8). The ticket data 65 comprises an event name, an event date, seating information, a ticket price, security information, and an advertisement or logo. The transmission between the service server 70 and the printing server 50 occurs via the TCP/IP network 60.

Figure 10:
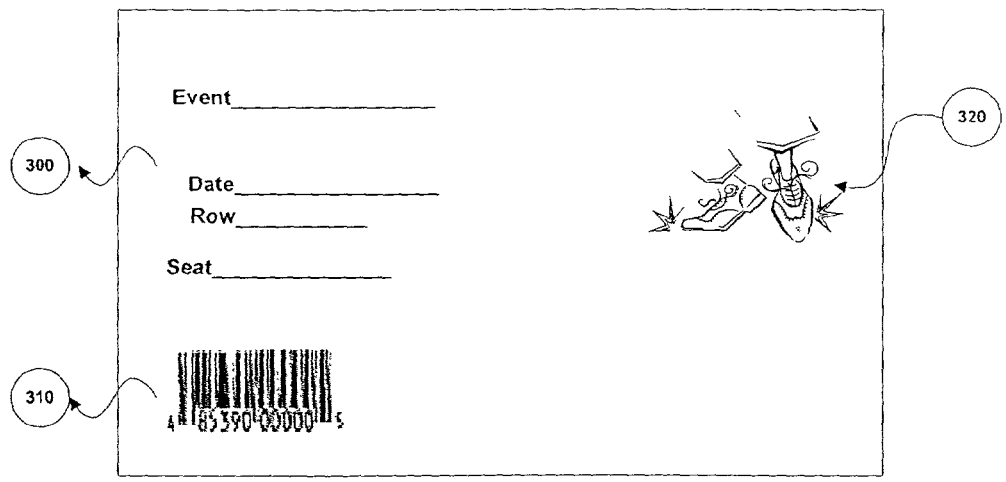
FIG. 10 illustrates a sample of a ticket as the permanent record printed as a result of the methods of FIGS. 7, 8, and 9.

Using the methods of in U.S. Publication No. 2002-0181010, the printing server 50 obtains information 160 (FIG. 8) relating to the printer 15 which is connected (via a physical or wireless connection) to the dataport of the mobile device. Obtaining the printer information comprises sending responses to the mobile device 10 over the network 20 and receiving requests from the mobile device 10 containing the printer information. The printer information 160 includes a name for the manufacturer and a model number for the specific printer, and/or any other printer descriptor for the specific printer. Using the printer information 160, the ticket data 165, and the data in a printing database 400 (FIG. 12) and a service database 500 (FIG. 13), which are contained in the printing data storage device 55 in the printing server 50, the print data is generated at the printing server 50 (step 170, FIG. 8). Through further use of the methods of U.S. Publication No. 2002-0181010, the print data is transmitted to the printer via the network 20 and the mobile device 10 (step 180, FIG. 8). Providing the print data comprises sending responses containing the print data to the mobile device 10 over the network 20. The printer 15 prints the print data and generates a ticket or tickets for the event. FIG. 10 illustrates a sample of a ticket printed as a result of the methods of FIG. 8. The user does not have to wait in a queue at the event to purchase the ticket or obtain the ticket from the "will call" window.

Figure 3B:
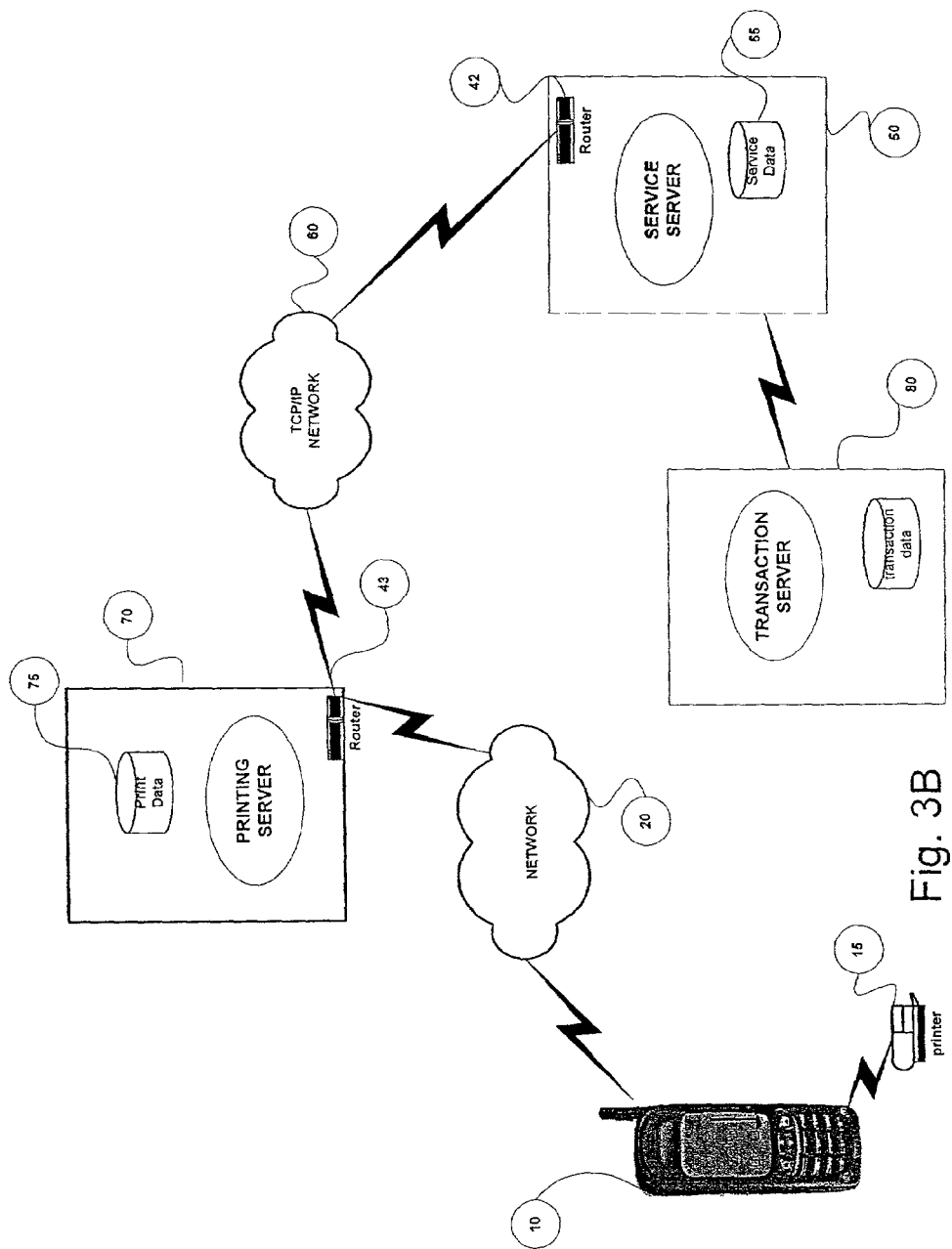
FIG. 3B depicts a graphical representation of an embodiment of the system that enables the providing of a service at a mobile device and generating, at the location of the mobile device, a permanent record of the service, where the receiving center is a receiving server and the receiving server is the printing server.

It should be apparent that the receiving server can be the printing server, as shown in FIG. 3B, or a separate server, as shown in FIG. 2, and the method of obtaining the ticket will be similar to the above described method.

Obtaining a Location Based Coupon

Figure 5A:
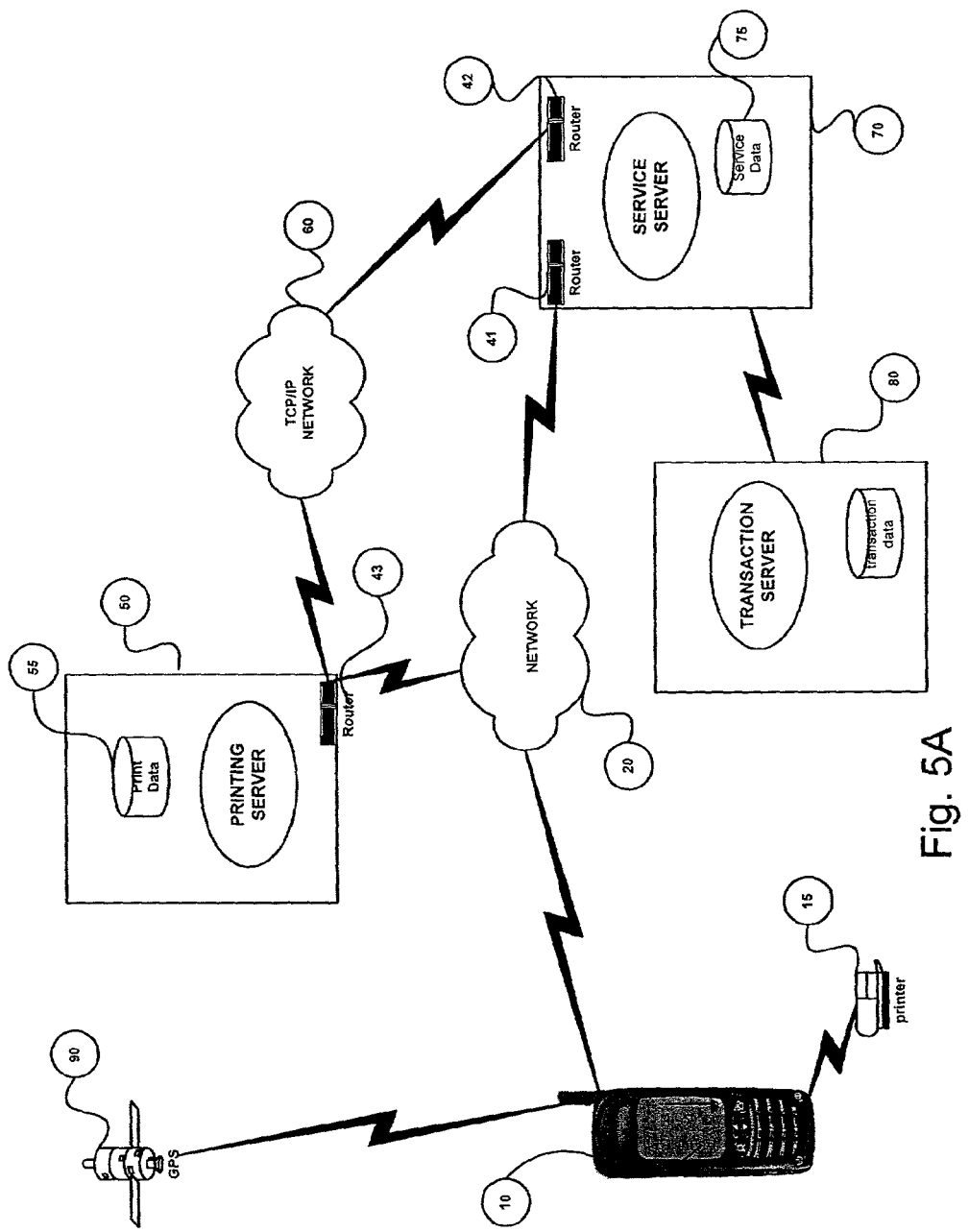
FIG. 5A depicts a graphical representation of an embodiment of the system that enables the providing of a service at a mobile device and generating, at the location of the mobile device, a permanent record of the service, where the receiving center is a receiving server, data on the location of the mobile device is available at the receiving server and the receiving server is the service server.

Referring to FIG. 5A, in one embodiment, the mobile device 10 is a WAP enabled device as shown in FIGS. 14A and 14B, the receiving server 17 is the service server 70 and the location data 185 (FIG. 9) is provided by a device based method, namely a GPS system 90. After selecting the WAP services mode as shown in FIG. 14B, the user can then select bookmarks or the micro browser. Referring to FIGS. 3A and 14B, when the user of the mobile device 10, the device 10 being in the Web access mode as shown in FIG. 14B, selects a bookmark, MyCoupons.com for example, from the user's bookmarks, a WAP request is transmitted by the device 10 through the network 20 and is converted by the WAP Gateway (not shown) to a Web request which is transmitted to the service server 70. The web site (not shown) MyCoupons.com resides at the service server 70. The service server 70 transmits back a response through the WAP Gateway and the network 20 to the micro browser in the device 10. Through a sequence of requests and responses, the user accesses the user's account at MyCoupons.com. Referring to FIG. 9, through the sequence of requests and responses, a request for coupons is received at the service server 70 (step 205).

The request (or subsequent requests) transmitted by the device 10 through the network 20 contains the location data for the mobile device 10. Thus, location data is received at the service server 70 (step 190). At the service server 70, user specific data is stored in the service data storage device 55. User specific data comprises user preferences for coupons for specific retailers. Using the location data, clock data available in computer centric systems, and the user preferences for coupons for specific retailers, request data for coupons for retailers in the vicinity of the location of the mobile device 10 can be generated at the service server 70 (step 210). At that point in the process, a response (analogous to an HTTP response) can be sent, from the service server 70, to the mobile device 10 informing the user of retailers near his location and confirming that coupons are being generated (step 145, FIG. 9). At this point in the method, the data for the service 165 is provided to the printing server 50 (step 140, FIG. 9). The coupon data 165 comprises a retailer's or product name, an expiration date, a discount amount, security information, and an advertisement or logo. The transmission between the service server 70 and the printing server 50 occurs via the TCP/IP network 60.

Figure 11:
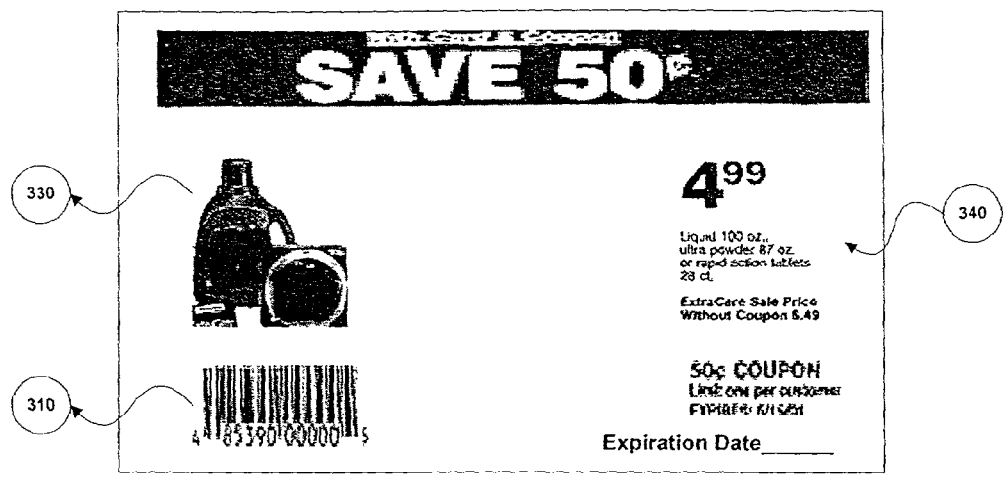
FIG. 11 illustrates a sample of a coupon as the permanent record printed as a result of the methods of FIGS. 7, 8, and 9.

Using the methods of in U.S. Publication No. 2002-0181010, the printing server 50 obtains information 160 (FIG. 9) relating to the printer 15 which is connected (via a physical or wireless connection) to the dataport of the mobile device. Obtaining the printer information comprises sending responses to the mobile device 10 over the network 20 and receiving requests from the mobile device 10 containing the printer information. The printer information 160 includes a name for the manufacturer and a model number for the specific printer, and/or any other printer descriptor for the specific printer. Using the printer information 160, the coupon data 165, and the data in a printing database 400 (FIG. 12) and a service database 500 (FIG. 13), which are contained in the printing data storage device 55 in the printing server 50, the print data is generated at the printing server 50 (step 170, FIG. 8). Through further use of the methods of U.S. Publication No. 2002-0181010, the print data is transmitted to the printer via the network 20 and the mobile device 10 (step 180, FIG. 9). Providing the print data comprises sending responses containing the print data to the mobile device 10 over the network 20. The printer 15 prints the print data and generates a coupon or coupons. FIG. 11 illustrates a sample of a coupon printed as a result of the above described method Thus, the user is provided with coupons for retailers of his choice that can be used at locations near his location.

Figure 5B:
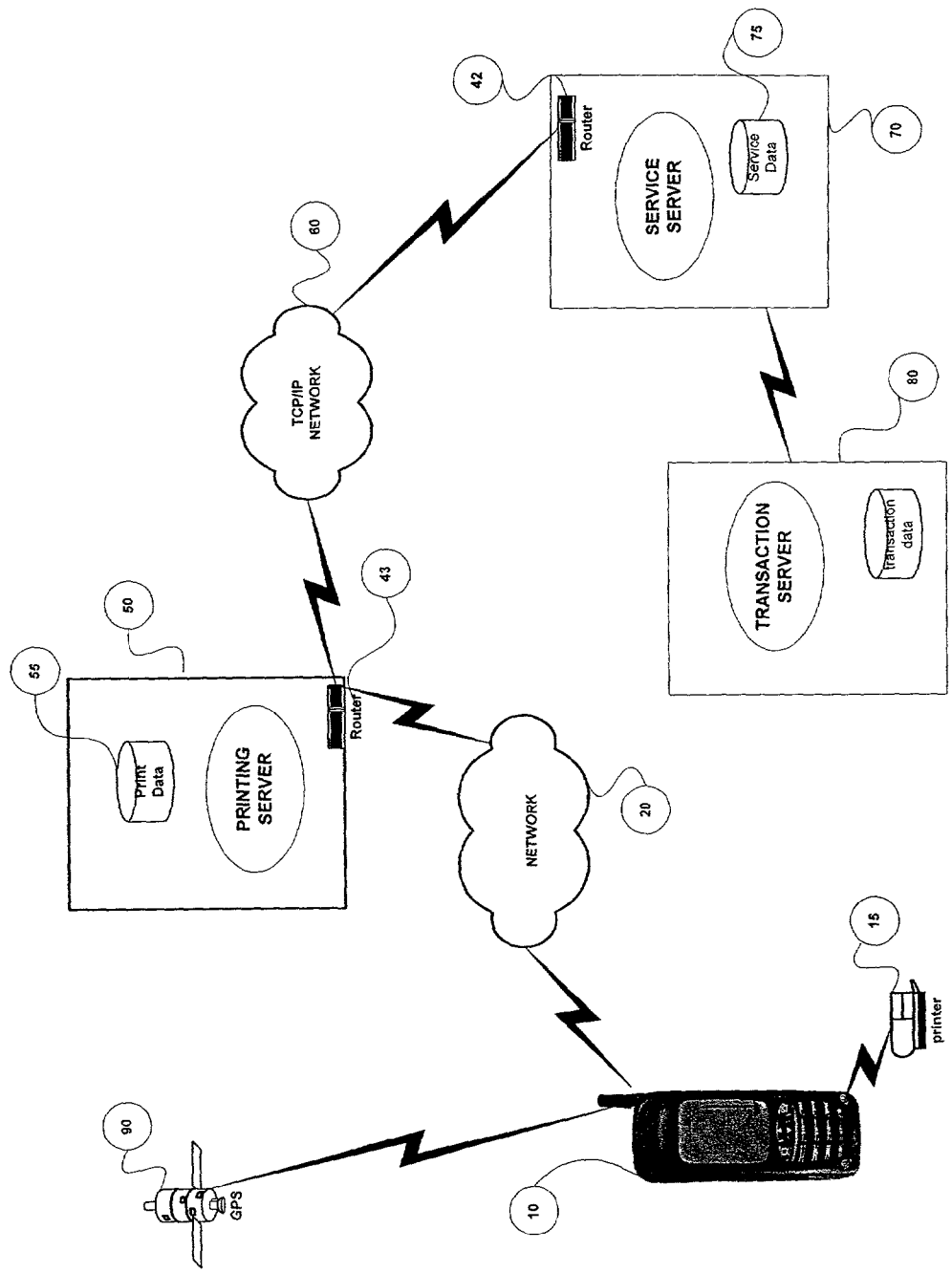
FIG. 5B depicts a graphical representation of an embodiment of the system that enables the providing of a service at a mobile device and generating, at the location of the mobile device, a permanent record of the service, where the receiving center is a receiving server, data on the location of the mobile device is available at the receiving server and the receiving server is the printing server.
Figure 6:
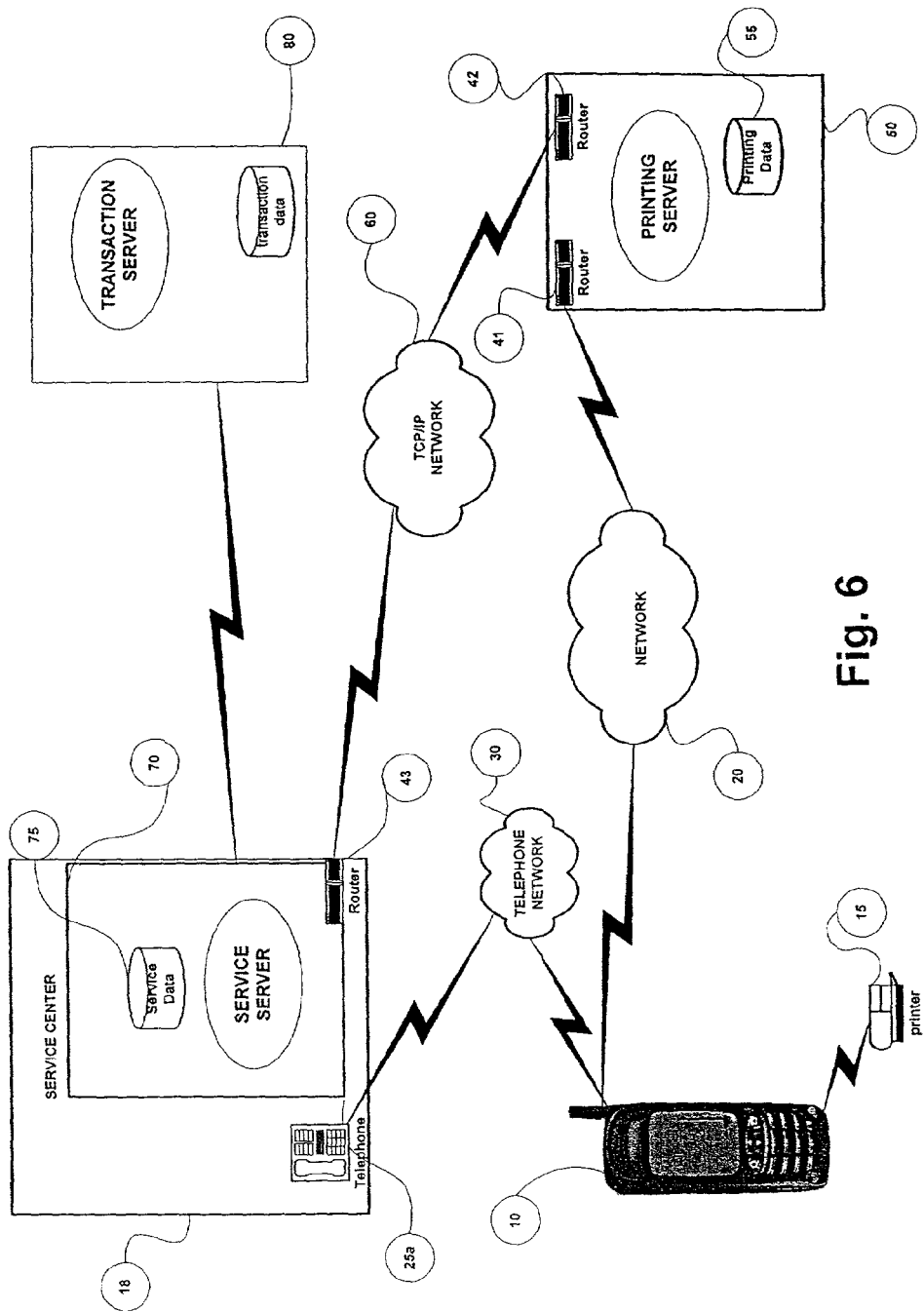
FIG. 6 depicts a graphical representation of an embodiment of the system that enables the providing of a service at a mobile device and generating, at the location of the mobile device, a permanent record of the service, where the receiving center is a service center.

It should be apparent that the receiving server can be the printing server, as shown in FIG. 5B, or a separate server, as shown in FIG. 4, and the method of obtaining the ticket will be similar to the above described method. It should also be apparent that in a system utilizing network based or user input based means of providing location data, the system will not appear different than that of FIG. 2 but the method will be similar to that of FIG. 9.

Ordering Tickets for an Event Via a Mobile Telephone

Referring to FIG. 5A, in one embodiment, the mobile device 10 is a WAP enabled device as shown in FIGS. 14A and 14B, the receiving server 17 is the service server 70 and the location data 185 (FIG. 9) is provided by a device based method, namely a GPS system 90. After selecting the WAP services mode as shown in FIG. 14B, the user can then select bookmarks or the micro browser. Referring to FIGS. 3A and 14B, when the user of the mobile device 10, the device 10 being in the Web access mode as shown in FIG. 14B, selects a bookmark, MyCoupons web site for example, from the user's bookmarks, a WAP request is transmitted by the device 10 through the network 20 and is converted by the WAP Gateway (not shown) to a Web request which is transmitted to the service server 70. The MyCoupons web site (not shown) resides at the service server 70. The service server 70 transmits back a response through the WAP Gateway and the network 20 to the micro browser in the device 10. Through a sequence of requests and responses, the user accesses the user's account at the MyCoupons web site. Referring to FIG. 9, through the sequence of requests and responses, a request for coupons is received at the service server 70 (step 205).

This completes the processing of the order for the tickets (step 110, FIG. 7). At that point in the process, a message can be sent, from the service server 70, to the mobile device 10 confirming that the request for the ticket has been completed (step 145, FIG. 7). That message can contain information to ensure that, in the event that the permanent record is lost, the user can still obtain the service. The message also informs the user that a ticket will be printed. The message could be electronic mail, an SMS service message, or any other form of electronic message. The user selects the WAP services mode as shown in FIG. 14B, and selects the micro browser.

Also at this point in the method, the data for the service 165 is provided to the printing server 50 (step 140, FIG. 7). The ticket data 165 comprises an event name, an event date, seating information, a ticket price, security information, and an advertisement or logo. The transmission between the service server 70 and the printing server 50 occurs via the TCP/IP network 60.

Using the methods of in U.S. Publication No. 2002-0181010, the printing server 50 obtains information 160 (FIG. 7) relating to the printer 15 which is connected (via a physical or wireless connection) to the dataport of the mobile device. Obtaining the printer information comprises sending responses to the mobile device 10 over the network 20 and receiving requests from the mobile device 10 containing the printer information. The printer information 160 includes a name for the manufacturer and a model number for the specific printer, and/or any other printer descriptor for the specific printer. Using the printer information 160, the ticket data 165, and the data in a printing database 400 (FIG. 12) and a service database 500 FIG. 13), which are contained in the printing data storage device 55 in the printing server 50, the print data is generated at the printing server 50 (step 170, FIG. 7). Through further use of the methods of U.S. Publication No. 2002-0181010, the print data is transmitted to the printer via the network 20 and the mobile device 10 (step 180, FIG. 7). Providing the print data comprises sending responses containing the print data to the mobile device 10 over the network 20. The printer 15 prints the print data and generates a ticket or tickets for the event. FIG. 10 illustrates a sample of a ticket printed as a result of the preceding method. The user does not have to wait in a queue at the event to purchase the ticket or obtain the ticket from the "will call" window.

It should be apparent that a voice portal can be used at the receiving center 12 or the service center 18 and the method will be similar to the above described.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

The services provided using the above described systems and methods comprise location independent services, such as tickets (both event and transportation—airline, train, bus—tickets), restaurant information (menus and reviews) and coupons, and location based services, such as obtaining directions/or and maps to the nearest store or hotel or to a given location, obtaining traffic information, obtaining restaurant information (menus and reviews) for restaurants in the vicinity og a given location and receiving location-based coupons at the mobile device.

While the particular embodiments described above utilize particular printing methods described in U.S. patent application Ser. No. 09/870,561, now U.S. Pat. No. 6,922,259, any of the printing methods described in U.S. patent application Ser. No. 09/870,561, now U.S. Pat. No. 6,922,259 can be used with this invention. As described in U.S. patent application Ser. No. 09/870,561, now U.S. Pat. No. 6,922,259, the connection between the mobile communications device 10 and the printing server 50 may be established in any of a variety of ways, such as by: (1) using the mobile communications device 10 to place a telephone call to the printing server 50 over a wireless voice network, (2) using the mobile communications device 10 as a modem to establish a connection to the printing server 50 over a data network, or (3) using the mobile communications device 10 in an Internet mode to connect to the printing server 50 (or an application server associated with the printing server) over the Internet.

The mobile device can be any device with computational, memory and wireless capabilities such as a wireless phone, a smart phone, a personal digital assistant (PDA) with wireless capability, a smart communication device, a mobile device installed an automobile or an intelligent digital camera with wireless capability.

The system can be enabled to transmit over network 20 using protocols such as WAP, the DoCoMo I-mode protocol, or any subsequent standard and use a mark up language such as WML, c-HTML, XHTML or any subsequent standard for mark up languages.

Any form of conversion from the reduced mark up language and protocol can be used and the conversion system, such as the WAP gateway or the I-mode center server, can be incorporated into the receiving server 17. Any configuration that enables the information to flow between the receiving server 17 and the mobile device 10 can be used.

It should be understood that the service server 70, transaction server 80, printing server 50 and receiving server 17 can be combined in several configurations and any combination performing the functions that allow a user to obtain, at mobile device 10, a permanent record of a service is within the scope of this invention. For example, service server 70, transaction server 80, printing server 50 can be combined in one server, or service 70 and transaction 80 servers can be combined and/or the printing server 50 can prepare the print data, transmits the print data to the service server 70 and the print data is transmitted to the mobile device 10 and printer 15 from the service server 70. The servers can be web servers, FTP servers or any form of server performing the required functions.

Servers 50, 70, 80 and 18 and mobile device 10 have computational and data storage capabilities and utilize computer readable media that contains the instructions for the computational operations. Common forms of computer-readable media include, for example, a floppy disk, a flexible disk, hard disk, magnetic tape, or any other magnetic medium, a CDROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Networks 20 and 60 use electrical, electromagnetic or optical signals that carry digital data streams representing various types of information. The signals through the various networks and through router or modems 41, 42, and 43 which carry the digital data to and from the mobile device 10, servers 50, 70, 80 and 18 are exemplary forms of carrier waves transporting the information. Since mobile device 10, servers 50, 70, 80 and 18 exchange digital data, which can include program code, mobile device 10, server 50, 70, 80 and 18 comprise an exemplary form of a computer controlled system.

Other embodiments of the invention, including combinations, additions, variations and other modifications of the disclosed embodiments will be obvious to those skilled in the art and are within the scope of the following claims.

What is claimed is:

1. A method of generating a permanent record of a service provided to a user at a location of a mobile device of the user, the method comprising:

receiving a request for a permanent record of a service and information identifying a specific printer on which the permanent record is to be printed, wherein the specific printer is located at the location of the mobile device of the user, and wherein the request for the permanent record and the information identifying a specific printer are received from the mobile device of the user;

processing the received request for the permanent record, wherein the processing includes generating data for printout of the permanent record, the data for printout comprising a digital image, the digital image comprising a plurality of pixels; and transmitting the generated data to a print server, wherein the print server is configured to modify the data for the printout based on the characteristics of the specific printer and transmit the modified data for the printout to the mobile device of the user, wherein the modification of the data comprises utilizing an adaptive halftone method;

wherein the mobile device is configured to communicate the modified data for the printout of the permanent record to the specific printer;

wherein the adaptive halftone method comprises performing the following for each pixel in the plurality of pixels:
  determining an input value of the pixel;
  determining a filtered value of the pixel based on a filter of the digital image;
  obtaining a difference value of the pixel, the difference value being the difference between the input value and the filtered value; and
  generating the output value for the pixel based on a relationship of the difference value to a threshold value, the threshold value based on a difference value and a filtered value of another pixel from the plurality of pixels.

2. The method of claim 1, further comprising:
completing a transaction with a transaction server prior to transmitting the generated data to a print server.

3. The method of claim 1, further comprising:
receiving data relating to the location of the mobile device, wherein the location of the mobile device is determined by the mobile device.

4. The method of claim 3, wherein the requested service is a location-based service.

5. The method of claim 1, further comprising:
transmitting a message to the mobile device after transmitting the generated data to a print server, wherein the message comprises a confirmation that the request for the permanent record has been filled.

6. The method of claim 1, wherein the requested service is an event ticket.

7. The method of claim 1, wherein the requested service is a coupon.

8. A system for generating a permanent record of a service provided to a user at a location of a mobile device of the user, the system comprising:
  a receiver configured to receive a request for a permanent record of a service and information identifying a specific printer on which the permanent record is to be printed, wherein the specific printer is located at the location of the mobile device of the user, and wherein the request for the permanent record and the information identifying a specific printer are received from the mobile device of the user;
  a processor configured to process the received request for the permanent record, wherein the processing includes generating data for printout of the permanent record, the data for printout comprising a digital image, the digital image comprising a plurality of pixels; and
  a transmitter configured to transmit the generated data to a print server, wherein the print server is configured to modify the data for the printout based on the characteristics of the specific printer and transmit the modified data for the printout to the mobile device of the user, wherein the modification of the data comprises utilizing an adaptive halftone method;

wherein the mobile device is configured to communicate the modified data for the printout of the permanent record to the specific printer;

wherein the adaptive halftone method comprises performing the following for each pixel in the plurality of pixels:
  determining an input value of the pixel;
  determining a filtered value of the pixel based on a filter of the digital image;
  obtaining a difference value of the pixel, the difference value being the difference between the input value and the filtered value; and
  generating the output value for the pixel based on a relationship of the difference value to a threshold value, the threshold value based on a difference value and a filtered value of another pixel from the plurality of pixels.

9. The system of claim 8, further comprising:
a communication mechanism configured to communicate with a transaction server prior to transmitting the generated data to a print server.

10. The system of claim 8, wherein the receiver is further configured to receive data relating to the location of the mobile device, wherein the location of the mobile device is determined by the mobile device.

11. The system of claim 10, wherein the requested service is a location-based service.

12. The system of claim 8, further comprising:
a transmitter configured to transmit a message to the mobile device of the user after transmitting the generated data to a print server, wherein the message comprises a confirmation that the request for the permanent record has been filled.

13. The system of claim 8, wherein the requested service is an event ticket.

14. The system of claim 8, wherein the requested service is a coupon.

15. A non-transitory computer readable medium comprising instructions for generating a permanent record of a service provided to a user at a location of a mobile device of the user, the instructions comprising:
  instructions for receiving a request for a permanent record of a service and information identifying a specific printer on which the permanent record is to be printed, wherein the specific printer is located at the location of the mobile device of the user, and wherein the request for the permanent record and the information identifying a specific printer are transmitted from the mobile device of the user;
  instructions for processing the received request for the permanent record, wherein the processing includes generating data for printout of the permanent record, the data for printout comprising a digital image, the digital image comprising a plurality of pixels; and
  instructions for transmitting the generated data to a print server, wherein the print server is configured to modify the data for the printout based on the characteristics of the specific printer and transmit the modified data for the printout to the mobile device of the user, wherein the modification of the data comprises utilizing an adaptive halftone method;

wherein the mobile device is configured to communicate the modified data for the printout of the permanent record to the specific printer;

wherein the adaptive halftone method comprises performing the following for each pixel in the plurality of pixels:
   determining an input value of the pixel;
   determining a filtered value of the pixel based on a filter of the digital image;
   obtaining a difference value of the pixel, the difference value being the difference between the input value and the filtered value; and
   generating the output value for the pixel based on a relationship of the difference value to a threshold value, the threshold value based on a difference value and a filtered value of another pixel from the plurality of pixels.

16. The non-transitory computer readable medium of claim 15, the instructions further comprising:
   instructions for completing a transaction with a transaction server prior to transmitting the generated data to a print server.

17. The non-transitory computer readable medium of claim 15, the instructions further comprising:
   instructions for receiving data relating to the location of the mobile device, wherein the location of the mobile device is determined by the mobile device.

18. The non-transitory computer readable medium of claim 15, the instructions further comprising:
   instructions for transmitting a message to the mobile device of the user after transmitting the generated data to a print server, wherein the message comprises a confirmation that the request for the permanent record has been filled.

19. The non-transitory computer readable medium of claim 15, wherein the requested service is an event ticket.

20. The non-transitory computer readable medium of claim 15, wherein the requested service is a coupon.

* * * * *